2,806,891

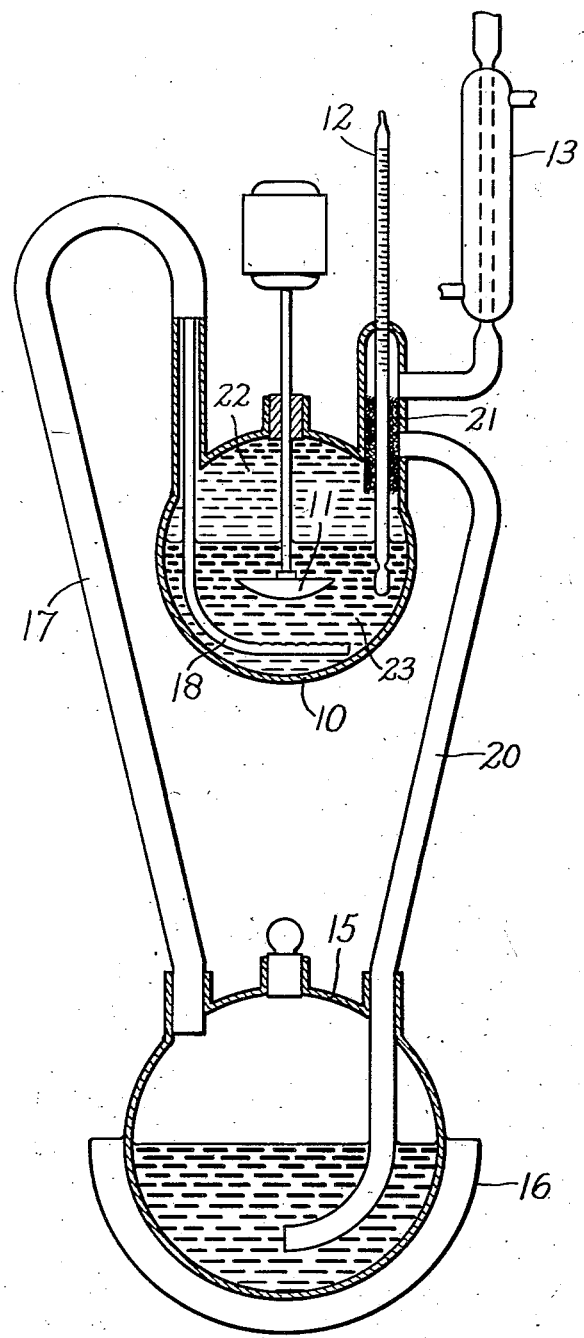

RECOVERY OF TRIMETHYLOLETHANE

Roy T. Gottesman, Clifton, and William R. Cake, Glen Rock, N. J., assignors to Heyden Newport Chemical Corporation, a corporation of Delaware Application May 25, 1954, Serial No. 432,156

3 Claims. (Cl. 260—637)

The present invention relates to a novel method of recovering trimethylolethane of high purity from aqueous reaction liquors highly contaminated with various impurities.

Trimethylolethane is produced by the condensation of about three moles of formaldehyde with one mole of propionaldehyde in an aqueous medium containing about one molar equivalent of a strongly alkaline compound. The alkaline compound maintains the reaction liquor alkaline during the course of the reaction and also enters into the reaction, which may be indicated as follows:

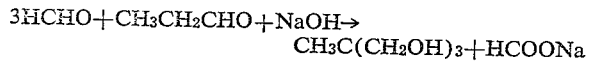

In order to increase the yield based on the amount of propionaldehyde charged, formaldehyde and sodium hydroxide are used in excess of the stoichiometric quantities required by the reaction as written. Other alkaline, water soluble alkali metal or alkaline earth compounds may be substituted for the sodium hydroxide. As the stronger alkaline compounds are preferred, either sodium hydroxide or calcium hydroxide is customarily used. If the metal has a valence greater than one, then the moles of alkaline compound can be reduced proportionately. After condensation has been completed and before recovery of the trimethylolethane, the free sodium hydroxide is preferably neutralized with acid. Formic acid is customarily used for this purpose as it forms sodium formate which is already present in the reaction liquor.

While various methods have been proposed for recovering trimethylolethane by precipitation directly from the reaction liquors, the character of the liquors is such that it is very difficult, if not impossible, to do this satisfactorily. The methods proposed heretofore for recovering trimethylolethane have not been commercially feasible and have had one or more serious drawbacks including low yield and production of very impure trimethylolethane. For many purposes, trimethylolethane must meet rigid standards of purity, particularly when used in the production of alkyd resins, esters and drying oils.

In accordance with the present invention, substantially pure trimethylolethane is recovered by a combined extraction and recrystallization process. Crude trimethylolethane in high yield is first extracted from the aqueous reaction liquor with methyl isobutyl ketone and the crude trimethylolethane is recovered from this solvent. The crude trimethylolethane is then recrystallized from a substantially water immiscible alcohol containing up to 15% water. The water immiscible alcohol is either a primary or secondary butyl alcohol or an amyl alcohol, or mixtures thereof. As used herein, the expression "amyl alcohol" includes the various isomers.

The present process has a number of advantages. While methyl isobutyl ketone is a good solvent for recovering trimethylolethane from a reaction liquor, it is not sufficiently selective and dissolves a relatively large amount of impurities along with trimethylolethane so that the trimethylolethane recovered is quite impure. This particular solvent does have the important advantage of recovering a very high percentage of the trimethylolethane. Upon recrystallization from aqueous solutions of the selected alcohols, a highly purified product is obtained in good yield. The amount of water added to the butyl or amyl alcohol depends upon the amount of impurities present in the crude trimethylolethane and may vary from 1% to 15% of the total solvent. The water apparently retains the impurities in solution and the presence of a small amount of water is important. An excess of water unduly reduces the recovery of trimethylolethane. In general, excellent results can be obtained with about 5% of water.

The amount of methyl isobutyl ketone used depends on the volume as well as the concentration of the reaction liquor. Normally, the amount of ketone will exceed the amount of liquor. If desirable, and in order to reduce the volume of methyl isobutyl ketone, the reaction liquor may be partially concentrated prior to extraction to remove some of the water, it being understood that such concentrated liquors are aqueous solutions. Any suitable type of apparatus may be used in extracting the reaction liquor. The solvent and reaction liquor may be mixed and then allowed to stand to permit separation into an upper trimethylolethane solvent extract phase and a lower aqueous phase containing a large portion of the impurities. The solvent phase can be readily separated by decantation and the trimethylolethane recovered by cooling and crystallization procedures applied to the solvent extract. Alternatively, a continuous extraction procedure may be used. For example, the reaction liquor may be mixed with a relatively small amount of solvent and solvent extract continuously withdrawn and fresh solvent continuously added. The fresh solvent may be methyl isobutyl ketone separated by distillation from withdrawn solvent extract. This procedure was followed in the following examples utilizing the hereinafter described apparatus and has the advantage of requiring a relatively smaller amount of solvent. Other forms of apparatus may be used.

Referring to the accompanying drawing which illustrates a type of continuous extraction apparatus which may be used, the apparatus includes an extraction vessel 10 equipped with a stirrer 11, thermometer 12 and a condenser 13. Reservoir 15 is provided with a heating element 16 and connected through tubes 17 and 18 with vessel 10 which in turn is in communication with reservoir 15 through tube 20. In operation, aqueous reaction liquor and methyl isobutyl ketone are placed in vessel 10 and agitated. The mixture separates or tends to separate into an upper solvent extract layer 22 and a lower aqueous layer 23. Solvent also is placed in reservoir 15 and when heated, the solvent vapors flow up tube 17 and into vessel 10 through tube 18. As soon as vessel 10 is full, if not filled initially, solvent extract flows from vessel 10 past screen 21 and through tube 20 to reservoir 15. The screen 21 prevents drops of water from being carried in tube 20. Thus, the solvent extract in reservoir 15 gradually becomes richer in trimethylolethane. After the trimethylolethane has been extracted, the upper layer of solvent extract in vessel 10 may be added to the extract in reservoir 15 and then all of the extract transferred to a crystallizer where the solution is cooled or concentrated further and cooled to separate the trimethylolethane by crystallization. The crystalline trimethylolethane may be separated from the mother liquor in any suitable manner.

*Example I*

Six hundred and forty-five parts by weight of trimethylolethane reaction liquor having a specific gravity of 1.25 at 50° C. was placed in vessel 10 with 490 parts of methyl isobutyl ketone while 1060 parts of methyl isobutyl ketone was placed in reservoir 15. The extraction extended over a period 14 hours at a temperature ranging between 69.5 and 76° C. The trimethylolethane solvent extract was cooled slowly to 10° C. and held at this temperature for three hours to effect crystallization of the trimethylolethane. The crystalline product was separated by filtration and washed with 20 parts of methyl isobutyl ketone and dried. A second crop of trimethylolethane was recovered by partially concentrating the filtrate and then cooling the concentrated liquor. A total of 196 parts of crude trimethylolethane was obtained in this manner which corresponded to a yield of 81.6% based on the amount of propionaldehyde charged in the original trimethylolethane reaction. The crude trimethylolethane contained 0.19% sodium formate and had a melting point below 180° C.

Example II

Two hundred and thirty pounds of aqueous trimethylolethane reaction liquor having a specific gravity of 1.25 at 50° C. was placed in vessel 10 along with 83 pounds of methyl isobutyl ketone. Also, 230 pounds of methyl isobutyl ketone was placed in reservoir 15 and extraction was continuous over a period of 16 hours at a temperature in the range of 80–90° C. The trimethylolethane-solvent extract was cooled to 10° C. and held at this temperature for three hours. The precipitated crude trimethylolethane was separated by centrifuging. In this manner, there was obtained 66.3 pounds of material corresponding to an 80% yield based on the amount of propionaldehyde charged. The crude trimethylolethane contained 0.82% sodium formate and had a melting point range of 185–198° C.

The crude trimethylolethane of either Example I or Example II may be purified in the manner described in any one of the following examples. This crude trimethylolethane is not suitable for most purposes and fails by a wide margin to meet the normal high standards for this product.

Example III

One hundred parts by weight of crude trimethylolethane obtained in Example II were added to a solution consisting of 95 parts of n-butanol and 5 parts of water and then heated until the trimethylolethane was dissolved. The turbid solution was filtered and then cooled slowly to 10° C. The crystallized trimethylolethane was separated from the mother liquor by filtration and then washed with 10 parts of 95% aqueous n-butanol. The product was dried and constituted a 72.8% recovery of purified trimethylolethane containing 0.034% sodium formate and having a melting point of 199.5–201° C. This material is suitable for use in alkyl resins, esters and drying oils.

Example IV

Fifty parts of crude trimethylolethane were treated with 48 parts of n-butanol and two parts by weight of water. The mixture was heated to reflux temperature and refluxed for five minutes and then filtered hot. The filtrate was cooled to 10° C. to precipitate the trimethylolethane which was separated from the aqueous alcohol mother liquor by filtration and then washed with 7 parts of cold anhydrous ether. The product was dried at 90° C. and in this manner there was obtained a recovery of 75.8% of highly purified trimethylolethane containing 0.13% sodium formate and having a melting point of 199.1–200.5%.

Example V

In this example, 50 parts of crude trimethylolethane obtained as described in Example II was treated with 45 parts of sec-butanol and 5 parts of water. The mixture was refluxed for five minutes, filtered hot and the filtrate was then cooled to 10° C. to crystallize the trimethylolethane. The trimethylolethane was separated from the mother liquor by filtration, washed with 7 parts of cold anhydrous ether and dried at 90° C. The trimethylolethane recovered in this manner contained 0.17% sodium formate, had a melting point of 199–200° C. and constituted a recovery of 65.2%.

Example VI

In this example, 50 parts of crude trimethylolethane obtained as described in Example II was treated exactly as described in Example V except that iso-butanol was used in place of sec-butanol. The purified trimethylolethane contained 0.12% sodium formate and had a melting point of 198–201° C. The recovery was 67%.

Example VII

Fifty parts of crude trimethylolethane obtained as described in Example II was treated with 45 parts of n-amyl alcohol and 5 parts of water. The mixture was heated to reflux and then refluxed for 5 minutes and filtered hot. The filtrate was cooled to 10° C. to precipitate the trimethylolethane which was separated from the mother liquor by filtration and then washed with 7 parts of cold anhydrous ether. The dried crystalline trimethylolethane contained 0.22% sodium formate, had a melting point of 197–200° C. and constituted a recovery of 79.6%.

Example VIII

Fifty parts of crude trimethylolethane obtained as described in Example II was mixed with 42.5 parts of isoamyl alcohol and 7.5 parts of water. The resulting mixture was heated to reflux, refluxed 5 minutes and filtered hot. The filtrate was then cooled to 10° C. to precipitate the trimethylolethane which was separated from the mother liquor by filtration. The separated trimethylolethane was washed with 14 parts of cold anhydrous ether and then dried at 90° C. The recovery was 74.2% and the purified trimethylolethane contained 0.22% sodium formate and had a melting point of 199.3–201° C.

Example IX

Fifty parts of crude trimethylolethane was treated with 42.5 parts of a mixture of secondary amyl alcohol and 7.5 parts of water. The mixture was refluxed for 5 minutes and then filtered hot. The filtrate was cooled to 10° C., the precipitated crystalline trimethylolethane was separated from the mother liquor by filtration and then washed with 14 parts of cold anhydrous ether. The crystalline trimethylolethane was dried and in this manner there was recovered 71.6% of trimethylolethane containing 0.19% sodium formate having a melting point of 196.5–199.5° C.

We claim:

1. In the process of recovering substantially pure trimethylolethane from trimethylolethane-containing aqueous reaction liquors produced by the alkaline condensation of formaldehyde and propionaldehyde in an aqueous medium, the steps comprising extracting trimethylolethane from such an aqueous liquor with hot methyl isobutyl ketone; recovering crude trimethylolethane from the trimethylolethane-methyl isobutyl ketone extract, and recrystallizing the crude trimethylolethane from alcohol containing from 1 to 15% by weight of water based on the total weight of alcohol and water, said alcohol being selected from the group consisting of n-butanol, isobutanol, sec-butanol, amyl alcohols and mixtures thereof.

2. In the process of recovering substantially pure trimethylolethane from trimethylolethane-containing aqueous reaction liquors produced by the alkaline condensation of formaldehyde and propionaldehyde in an aqueous medium the steps comprising extracting trimethylolethane from such an aqueous liquor with hot methyl isobutyl ketone; cooling the trimethylolethane-methyl isobutyl ketone extract and crystallizing trimethylolethane; separating crude crystallized trimethylolethane from the methyl isobutyl ketone mother liquor; treating the crude crystallized trimethylolethane with a solvent consisting by weight of 85 to 99% alcohol and 1 to 15% of water, said alcohol being selected from the group consisting of n- butanol, iso-butanol, sec-butanol, amyl alcohols and mixtures thereof; crystallizing trimethylolethane from the aqueous alcohol solution and separating the crystallized trimethylolethane from the aqueous alcohol mother liquor.

3. In the process of recovering substantially pure trimethylolethane from trimethylolethane containing aqueous reaction liquors produced by the alkaline condensation of formaldehyde and propionaldehyde in an aqueous medium, the steps comprising extracting trimethylolethane from such an aqueous liquor with methyl isobutyl ketone at a temperature in the range of 69.5–90° C.; cooling the trimethylolethane-methyl isobutyl ketone extract and crystallizing trimethylolethane; separating crude crystallized trimethylolethane from the methyl isobutyl ketone mother liquor; treating the crude crystallized trimethylolethane with a hot solvent consisting by weight of about 95% alcohol and about 5% of water, said alcohol being selected from the group consisting of n-butanol, iso-butanol, sec-butanol, amyl alcohols and mixtures thereof; crystallizing trimethylolethane from the aqueous alcohol solution and separating the crystallized trimethylolethane from the aqueous alcohol mother liquor.

References Cited in the file of this patent

UNITED STATES PATENTS

| | | |
|---|---|---|
| 2,292,926 | Brubaker et al. | Aug. 11, 1942 |
| 2,347,312 | Cox | Apr. 25, 1944 |
| 2,479,041 | Elgin | Aug. 16, 1949 |